July 19, 1960  C. S. B. EDMONDSON, JR  2,945,732
SUPPORT WITH ADJUSTABLE FORM-FITTING COMPARTMENTATION
Filed Aug. 7, 1956  2 Sheets-Sheet 1

INVENTOR
Charles S. B. Edmondson, Jr.
BY John Boyle
ATTORNEY

July 19, 1960   C. S. B. EDMONDSON, JR   2,945,732
SUPPORT WITH ADJUSTABLE FORM-FITTING COMPARTMENTATION
Filed Aug. 7, 1956   2 Sheets-Sheet 2

INVENTOR
Charles S. B. Edmondson, Jr.
BY John Boyle
ATTORNEY

United States Patent Office 2,945,732
Patented July 19, 1960

2,945,732

SUPPORT WITH ADJUSTABLE FORM-FITTING COMPARTMENTATION

Charles S. B. Edmondson, Jr., 5600 Morton Place SE., Washington, D.C.

Filed Aug. 7, 1956, Ser. No. 602,583

1 Claim. (Cl. 312—140.3)

My invention relates to a means for more orderly and easily stowing and using small rigid objects, individually or in groups, such as cans, boxes, bottles, dishes, etc. that are found in the home around kitchens, bath rooms, home work shops, etc. It can be used elsewhere such as in repair garages, work shops, and store rooms where small objects subject to frequent use are stored, in cabinets, on shelves, in drawers, etc.

My invention is primarily designed to provide the facility of orderly, efficiently, and attractively stowing objects in areas, such as small kitchens, where every inch of storage space counts. For instance, there is normally a storage space under the kitchen sink where all sorts of miscellaneous objects from soap boxes to bottles are normally stored. In time this area usually becomes quite cluttered; things start being piled or thrown in; and seeing what is there and getting to it without moving something else becomes a problem. Also, in small apartments especially, there is never enough shelf space in the kitchen. Cans, bottles, boxes, and other objects eventually fill all the available space, and things get so jumbled up—such as smaller cans being obscured by other cans— that it becomes impossible to glance over the shelves and easily see what is there. My invention also would provide a means for maintaining adjustable defined areas for a working stowage for plates, cups, saucers, etc.

To accomplish the above objects, I provide a board whereby small individual adjustable storage areas in the form of squares, rectangles, and channels can be easily established and changed with the need.

For instance, under the sink a person might want to establish individual stowage areas for a number of larger boxes, cans or bottles that are frequently used around the kitchen. My invention would (1) make it easier to get to the object due to its better accessibility, (2) afford a definite place to put it back, and (3) improve the orderliness, accessibility, and visibility of everything else under the sink due to the proper placement by sizes.

On over-crowded kitchen shelves where small objects become easily obscured, channel type sections open in the front can be formed so that objects can be stored either by size or by category, thus improving organization and visibility.

Reference is made to the drawings for a more complete disclosure of my invention, in which.

Figure 3:
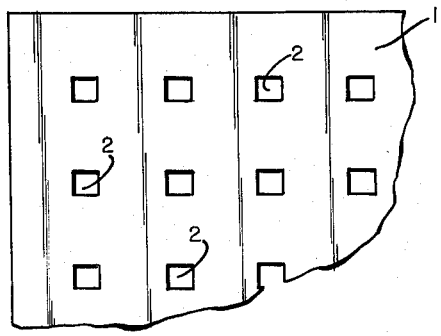
Fig. 3 is a fragmentary plan view of the board.

Referring to Fig. 3, the board 1 is provided with equally spaced square holes 2 over the entire surface. Into these holes are inserted the square pegs 3 with which each divider is provided for adjustably locating it on the board.

Figure 4:
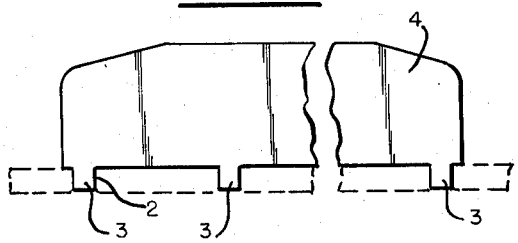
Fig. 4 is an elevation of a straight divider in place on the board.

In Fig. 4 is shown a straight line divider 4 which may be of any desired length.

Figure 5:
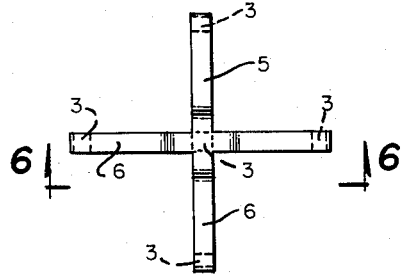
Fig. 5 is a plan view of a four-cornered divider.
Figure 6:
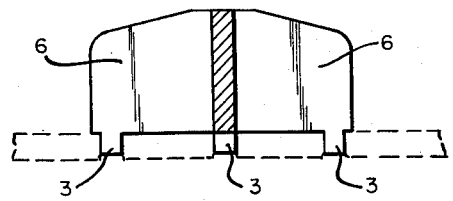
Fig. 6 is a section on the line 6—6 of Fig. 5.

In Figs. 5 and 6 is shown a divider 5 in the form of a cross, the dividing walls 6 having a square peg 3 at each end and one at the intersection, all fitting in the spaced holes 2.

Figure 7:
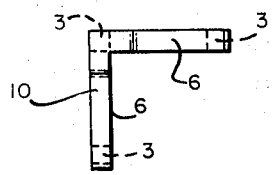
Fig. 7 is a plan view of a one-cornered divider.

In Fig. 7 is shown a divider 10 in the form of a right angle, having dividing walls 6 with a square peg 3 at the end of each wall and at the intersection.

Figure 8:
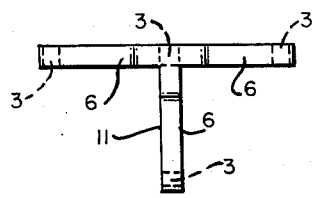
Fig. 8 is a plan view of a two-cornered divider.
Figure 9:
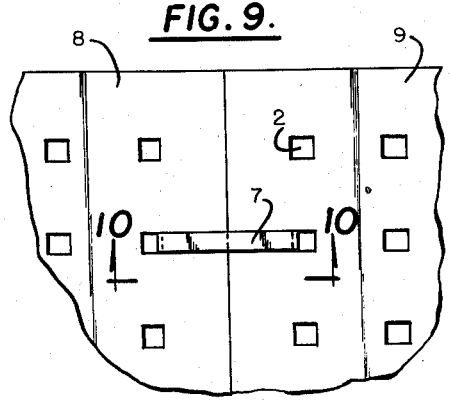
Fig. 9 is a fragmentary plan view showing two adjoining boards clipped together.
Figure 10:
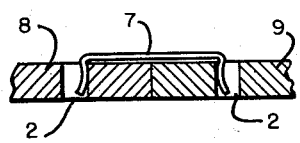
Fig. 10 is a section on the line 10—10 of Fig. 9.

In Fig. 8 is shown a T-shaped divider 11 having dividing walls 6 with a square peg 3 at the end of each wall 6 and at the intersection of the walls 6.

In order to increase the size of a board adjoining sections 8 and 9 may be held together by spring clips 7 inserted in the holes 2.

Figure 1:
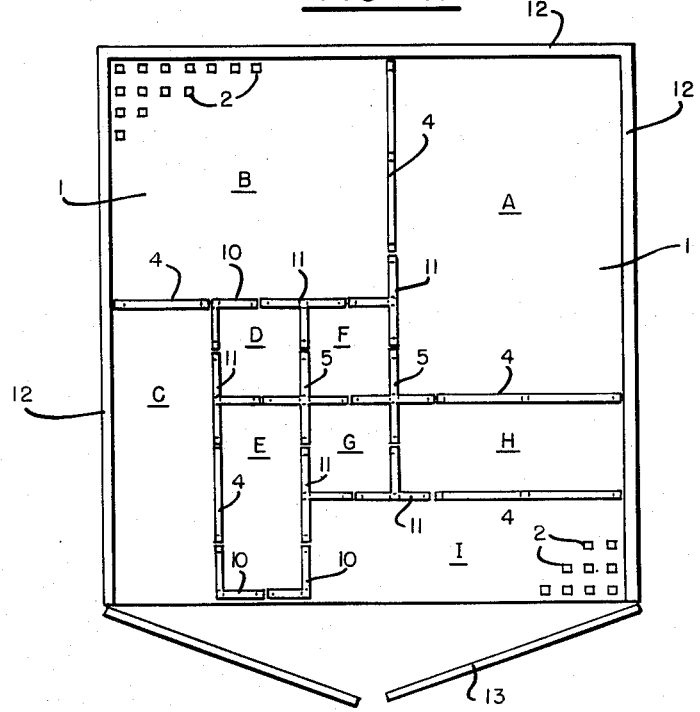
Fig. 1 is a plan view showing the device located in a cabinet.

In Fig. 1 is shown one of a number of possible arrangements of stowage spaces by selection and location of the dividers on a board 1. The board as shown is cut to order and of any desired dimensions, such as three feet square. The entire surface of the board is provided with square holes 2, spaced as in Fig. 3, those showing in the corners being only fragmentary.

The space A of the board 1 is bounded by dividers 4, 11, 5 and 4; the space B is bounded by dividers 4, 10, 11, 11 and 4; the space C is bounded by dividers 4, 10, 11, 4 and 10; the space D is bounded by dividers 10, 11, 5 and 11; the space E is bounded by dividers 11, 4, 10, 11 and 5; the space F is bounded by dividers 11, 11, 5 and 5; the space G is bounded by dividers 5, 5, 11 and 11; the space H is bounded by dividers 5, 4, 4 and 11; the space I is bounded by dividers 10, 11, 11 and 4.

The board as shown in Fig. 1 is removably inserted and rests on the base of the cabinet 12 that may have swinging doors 13.

Figure 2:
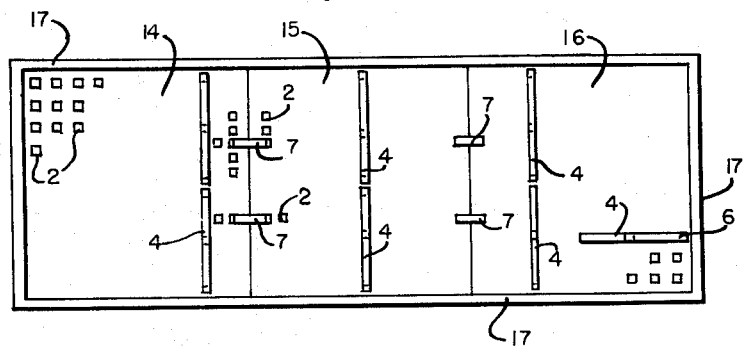
Fig. 2 is a plan view of a shelf type.

In the modification shown in Fig. 2 a shelf is made up of three boards 14, 15 and 16, similar in construction to the board 1 and clipped together by the spring clips 7. This shelf rests on any suitable support 17. The board may be provided with straight line dividers 4 that form compartments open in the front and that permit horizontal access.

From the above description, it will be seen that I employ two distinct elements, a board and dividers. The board will be made from some pressed board, such as Masonite, and in one form, $3/16''$ to $1/4''$ thick, and would be sold in one foot square sections or cut to order from a larger section. These square sections would then be butted together to fit approximately, any stowage area. In the one foot square board would be punched $3/16''$ square holes, spaced $1/2''$ apart and $13/32''$ from the margin, with 17 to the row. These are the holes into which the pegs of the dividers are inserted. The holes provide the means of adjusting the pegs so that small stowage areas of varying sizes can be formed and changed when the need arises. These small areas would normally be in the form of squares, rectangles or channels. However, irregular shapes can be made if needed.

I claim:

A support for storing articles comprising a board provided with a plurality of equally spaced holes forming rows at right angles to each other, a plurality of differently shaped dividers having a wall and provided with a plurality of integral similarly spaced pegs on their undersides inserted in the holes to adjustably position the dividers on the board with the walls extending vertically above the board to provide compartmented storage areas, at least one divider including walls forming a right angle to provide rectangular storage areas of different sizes.

References Cited in the file of this patent

UNITED STATES PATENTS

| | | |
|---|---|---|
| 991,722 | Hourd | May 9, 1911 |
| 1,770,942 | Morris | July 22, 1930 |
| 2,104,912 | Streeter | Jan. 11, 1938 |
| 2,114,510 | Thomas | Apr. 19, 1938 |
| 2,204,319 | Parsons | June 11, 1940 |
| 2,207,515 | Hueglin | July 9, 1940 |
| 2,228,221 | Bales | Jan. 7, 1941 |
| 2,257,536 | Roycroft | Sept. 30, 1941 |
| 2,532,767 | Galkin | Dec. 5, 1950 |
| 2,614,715 | Ross | Oct. 21, 1952 |
| 2,649,968 | Rice | Aug. 25, 1953 |
| 2,715,492 | Zebarth | Aug. 16, 1955 |
| 2,724,627 | Moncier | Nov. 22, 1955 |
| 2,728,482 | Driver | Dec. 27, 1955 |
| 2,812,225 | Traxler | Nov. 5, 1957 |
| 2,883,764 | Stephens | Apr. 28, 1959 |

FOREIGN PATENTS

| | | |
|---|---|---|
| 588,518 | Great Britain | May 27, 1947 |
| 764,543 | France | Mar. 5, 1934 |